United States Patent [19]
Boelryk

[11] Patent Number: 5,222,814
[45] Date of Patent: Jun. 29, 1993

[54] VEHICLE SEAT TRACK ASSEMBLY

[75] Inventor: Bartholomew J. Boelryk, Bracebridge, Canada

[73] Assignee: Rockwell International Corporation, Pittsburgh, Pa.

[21] Appl. No.: 954,629

[22] Filed: Sep. 30, 1992

[51] Int. Cl.$^5$ ............... F16C 29/04; F16M 13/00
[52] U.S. Cl. ........................... 384/47; 248/430
[58] Field of Search ............... 384/18, 47, 49; 296/65; 248/430, 429

[56] References Cited

U.S. PATENT DOCUMENTS

| | | | |
|---|---|---|---|
| 3,759,587 | 9/1973 | Christin | 384/47 |
| 4,776,551 | 10/1988 | Nishino | 248/429 |
| 4,787,667 | 11/1988 | Nishino | 248/430 X |
| 4,950,088 | 8/1990 | Pipon et al. | 384/47 |

Primary Examiner—Thomas R. Hannon

[57] ABSTRACT

Telescoping lower and upper tracks which comprises nested open channel sections. The lower track includes a three sided channel with opposing sides each forming one half of a bearing race. The open portion of the channel is defined by in-turned lips which enhance structural rigidity thereof. The upper track also includes a three sided channel with opposing sides forming the second half of a bearing race. The open portion of the channel is defined by outwardly extending lips which enhance structural rigidity thereof. A series of balls located in the bearing race established by the upper and lower track define a structural relationship therebetween. A retainer is disposed on the upper track and includes a laterally extending portion which occupies the opening defined by the inner track. The retainer limits the amount of dimensional displacement which may occur between the upper and lower tracks to an amount within the elastic range of deformation of the balls used to define the structural relationship therebetween.

15 Claims, 2 Drawing Sheets

VEHICLE SEAT TRACK ASSEMBLY

BACKGROUND OF THE INVENTION

1. Field of the Invention

The present invention relates to track assemblies used to position vehicle seating and, more specifically, to a track assembly featuring low noise and vibration transmission while providing rigid structural properties.

2. Description of Related Art

Intersliding tracks require friction reducing bearings to facilitate ease of adjustment as well as minimize looseness in the structural relation between tracks. Conventional steel ball bearings brinell and/or create grooves in one or more of the track profiles. This leads to a rough sliding motion. In addition, the steel balls readily conduct noise and vibration therethrough. Finally, deformation of either of the intersliding tracks can cause structural failure thereof when loads cause deformations which exceed the range of elasticity of the components. Therefore, there is a need for an intersliding track assembly which resists transmission of noise and vibration while providing a rigid structure resistant to structural failures.

SUMMARY OF THE PRESENT INVENTION

The present invention features telescoping lower and upper tracks which comprises nested open channel sections. The lower track includes a three sided channel with opposing sides each forming one half of a bearing race. The open portion of the channel is defined by in-turned lips which enhance structural rigidity thereof. The upper track also includes a three sided channel with opposing sides forming the second half of a bearing race. The open portion of the channel is defined by outwardly extending lips which enhance structural rigidity thereof. A series of balls located in the bearing race established by the upper and lower track define a structural relationship therebetween. A retainer is disposed on the upper track and includes a laterally extending portion which occupies the opening defined by the inner track. The retainer limits the amount of dimensional displacement which may occur between the upper and lower tracks to an amount within the elastic range of deformation of the balls used to define the structural relationship therebetween.

These and other aspects of the present invention will become more readily apparent by reference to the following detailed description of the embodiments as shown in the drawings.

DETAILED DESCRIPTION OF THE PREFERRED EMBODIMENT

Figure 1:
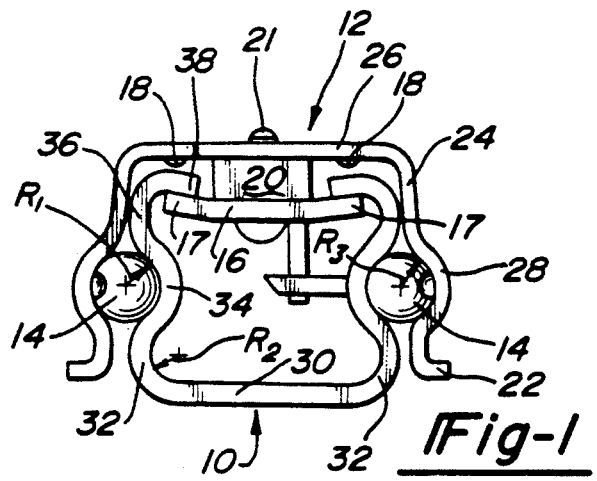
FIG. 1 is a cross section of the track assembly of the present invention.
Figure 2:
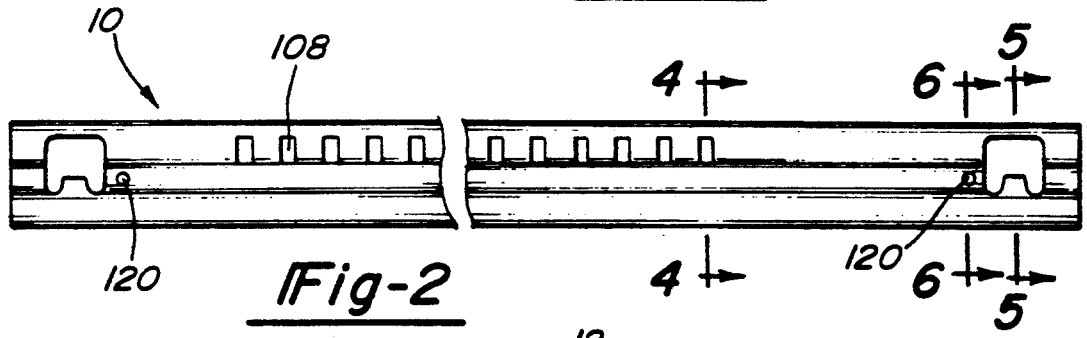
FIG. 2 is a side view of the lower track of the present invention.
Figure 3:
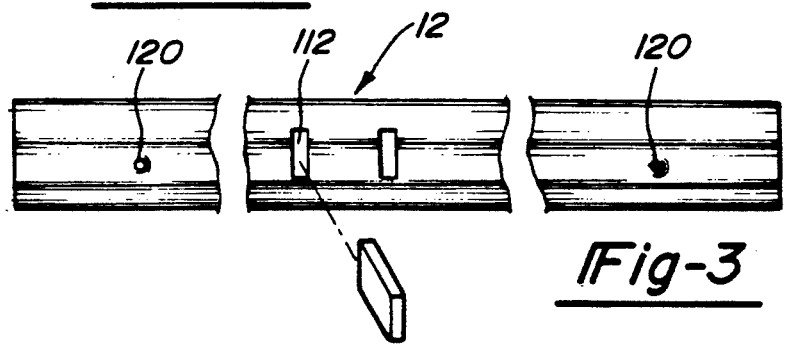
FIG. 3 is a side view of the upper track of the present invention.
Figure 4:
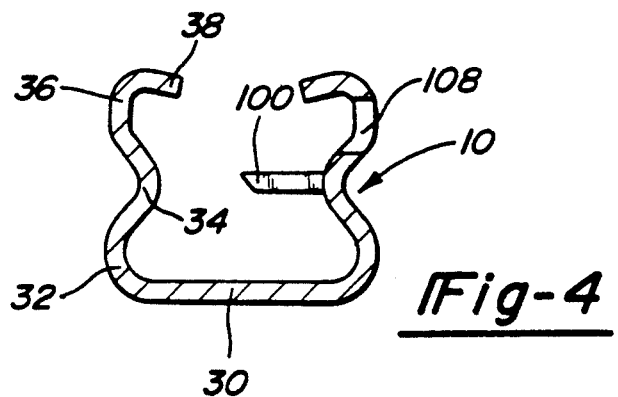
FIG. 4 is a cross section of FIG. 3 at 4—4.
Figure 5:
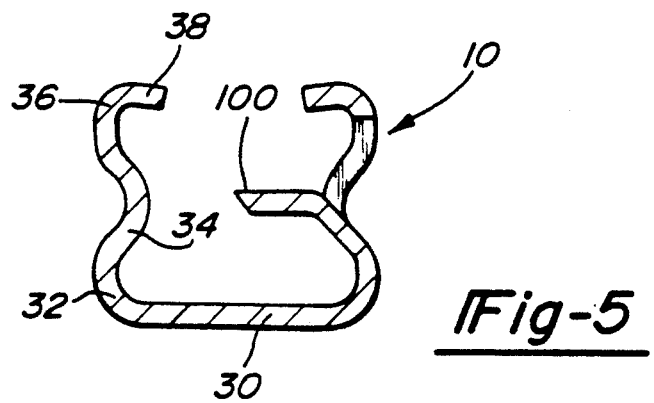
FIG. 5 is a cross section of FIG. 3 at 5—5.
Figure 6:
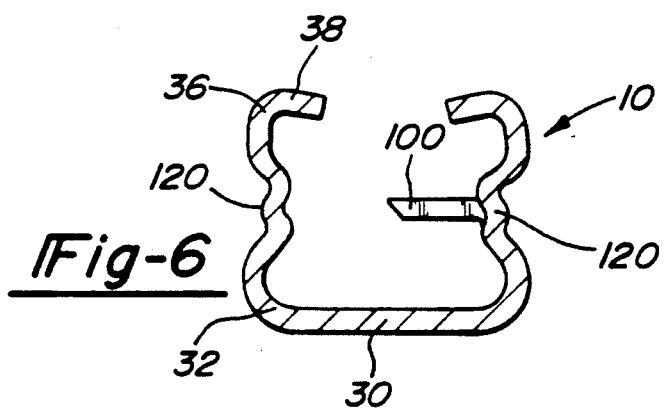
FIG. 6 is a cross section of FIG. 3 at 6—6.
Figure 7:
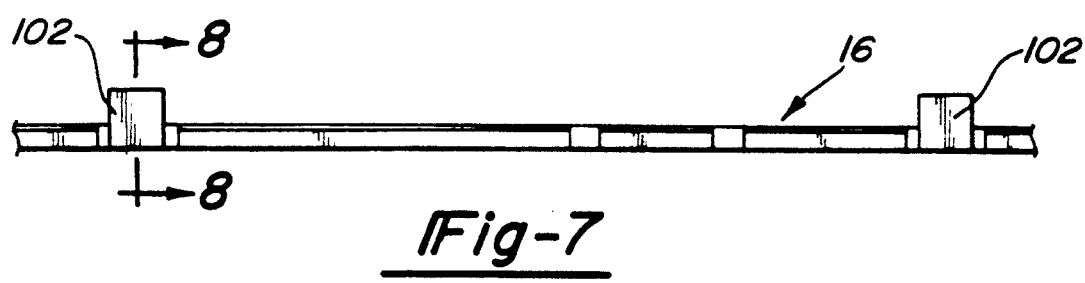
FIG. 7 is a side view of the retainer plate of the present invention.
Figure 8:
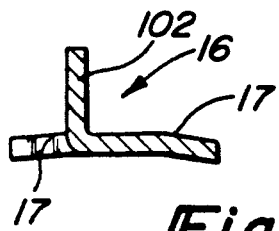
FIG. 8 is a cross section view of FIG. 7 at 8—8.

The present invention comprises an intersliding track assembly including a lower track 10 which is telescopically received within an upper track 12. Ball bearings 14, preferably constructed of a resilient elastomeric material, provide a low friction structural interface between upper and lower tracks 10, 12. Lower track 10 is roll formed or stamped from a sheet of steel and preferably includes a bilaterally symmetrical structure which features a laterally extending floor mount surface 30 which is bent upwardly forming rib 32 along radius $R_2$ which terminates in a reversed rib 34 formed as radius $R_1$ which terminates in a vertical rise 36 and finally ends as in-turned lip 38. In-turned lip 38 is formed at an angle which is less than 90° with respect to vertical rise 36. Upper track 12 is roll formed or stamped from a sheet of steel and preferably includes a bilaterally symmetrical structure which features a laterally extending seat mount surface 26 which is downwardly turned to form vertical skirt 24 which terminates in upper track ball chase 28 formed as a rib of radius $R_3$ and finally ends as reinforcing rib 22. Retainer plate 16 is secured to upper track 12 by spacer bar 20 and fastener 21. Retainer plate 16 extends laterally in the region secured to spacer bar 20 and features opposed up-turned lips 17, 17. Retainer plate 16 featuring up-turned lips 17, 17 preferably form a down turned angle of 15°-20° for ideal structural ridigity. Balls 14 installed in the channel formed by rib 34 and ball chase 28 provide telescopic interfit of lower track 10 and upper track 12 and define the structural interrelation therebetween. Lateral or vertical loading of upper track 12 with respect to lower track 10 causes deformation of balls 14. Such deformation is restricted by the structural interference of components. For example, vertical loading of upper track 12 which exceeds a predetermined value and causes deformation of balls 14 may be sufficient to cause physical contact between overload rib 18 and in-turned lip 38. Vertical lifting of upper track 12 which causes deformation of ball bearing 14 may be sufficient to cause physical contact between up-turned lip 17 and in-turned lip 38. Lower track 10, vertical rise 36 includes a series of axially displaced slots 108 formed therein (as shown in FIG. 4) to receive a laterally displaceable link 110 which is carried by slot 112 formed in upper track 12 (as shown in FIG. 3). Tabs 100 turned in from side wall portions of rib 34 of lower track 10, shown in FIG. 5, engage respective down turned tabs 102 of up turned lip 17, 17 of retainer plate 16 (shown in FIGS. 7 and 8) to define end of travel stops for the intersliding track assembly. Dimples 120, shown in FIG. 6, formed in lower track 10 serve as end of travel limits for balls 14 retaining same within the race defined by rib 32 and ball chase 28.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A track assembly comprising:

a lower track telescopically disposed within an upper track;

said lower track formed as a first bilaterally symmetrical open channel section including a lower laterally extending portion connecting opposed upright portions;

each said upright portion formed as a first outwardly formed radius extending upwardly from said lower laterally extending portion which is connected with a first inwardly extending radius which is connected to a first vertically extending portion;

said first vertically extending portion including an in-turned lip formed at an angle less than 90° with respect thereto;

said upper track formed as a second bilaterally symmetrical open channel section including an upper laterally extending portion connecting opposed vertically extending members;

each said vertical member formed as a second outwardly formed radius extending downwardly from said upper laterally extending portion which is connected to a second vertically extending portion connected to a third outwardly extending radius connected to a third vertically extending portion connected to an outwardly extending lip;

said first inwardly extending radius of said lower track and said third outwardly extending radius of said upper track cooperating to form a channel;

a plurality of spherical members disposed in said channel and defining a structural interconnection between said lower and upper track;

a retainer plate connected to said laterally extending portion of said upper track including a first laterally extending portion having opposed wing portions formed at an upward angle with respect thereto; and said opposed connected wing portions disposed within said open channel section formed by said lower track proximate said in-turned lip of said lower track.

2. The invention of claim 1 wherein said spherical members are resilient balls.

3. The invention of claim 1 wherein said upper track includes means to extend said upper laterally extending portion downwardly in a portion of said second open channel proximate said in-turned lip of said lower track.

4. The invention of claim 1 wherein said upper track includes a slot defined therein which slidingly receives a laterally displaceable link which is selectively engageable with one of a plurality of slots defined in said lower track.

5. The invention of claim 1 wherein said lower track upright portions form laterally extending tabs proximate end portions thereof which engage respective upwardly extending tabs defined on opposing end portions of said retainer plate to define end of travel limits of said track assembly.

6. The invention of claim 1 wherein said spherical members are resilient balls which are characterized by a predetermined limit of elastic deformation.

7. The invention of claim 6 wherein at least one of said in-turned lips of said lower track and said upper track laterally extending portion contact upon a deformation dimension less than said predetermined limit of said spherical members.

8. The invention of claim 6 wherein at least one of said in-turned lips of said lower track and a respective one of said wing portions of said retainer plate contact upon a deformation dimension less than said predetermined limit of said spherical members.

9. A track assembly comprising:

a first track telescopically received within a second track;

said first track formed as a bilaterally symmetrical open channel member defining a first opening including a first laterally extending portion connected to opposed vertically extending side portions which each define a first one-half of a bearing race;

said vertically extending side portions terminating as inwardly extending lip members;

said second rack formed as a bilaterally symmetrical open channel member defining a second opening including a second laterally extending portion connected to opposed vertically extending side portions which define a second one-half of a bearing race;

said first and second one-half of a bearing race forming a channel with spherical members disposed therein and defining a telescopic structural relation between said first and second track;

a retainer disposed on said second track including a laterally extending portion disposed in said first opening of said first track; and said retainer, said inwardly extending lip members, and said second laterally extending portion defining a structural limit of deformation between said first and second track which is a dimension less than the limit of elastic deformation of said spherical members.

10. The invention of claim 9 wherein said spherical members are resilient balls.

11. The invention of claim 9 wherein said inwardly extending lip members of said first track are oriented to said side portions at an angle less than 90°.

12. The invention of claim 9 wherein said second track includes means to extend said second laterally extending portion downwardly into said second opening proximate said inwardly turned lip members.

13. The invention of claim 9 wherein said second track includes a slot defined therein which slidingly receives a laterally displaceable link which is selectively engageable with one of a plurality of slots defined in said first track.

14. The invention of claim 9 wherein at least one of said opposed vertically extending portions form laterally extending tabs proximate end portions thereof which engage respective upwardly extending tabs defined on opposing end portions of said retainer to define end of travel limits of said track assembly.

15. The invention of claim 9 wherein said retainer comprises a laterally extending portion having opposed wing portions formed at an upward angle.

* * * * *